United States Patent [19]

Clark et al.

[11] Patent Number: 4,890,295

[45] Date of Patent: Dec. 26, 1989

[54] LASER APPARATUS

[75] Inventors: Graeme L. Clark, Chelmsford, United Kingdom; Arthur Maitland, Fife, Scotland

[73] Assignee: English Electric Valve Company Limited, Chelmsford, United Kingdom

[21] Appl. No.: 192,650

[22] Filed: May 11, 1988

[30] Foreign Application Priority Data

May 12, 1987 [GB] United Kingdom ............... 8711212

[51] Int. Cl.$^4$ .............................................. H01S 3/03
[52] U.S. Cl. ...................................... 372/61; 372/97; 372/64
[58] Field of Search ................. 372/97, 92, 33, 61, 372/64

[56] References Cited

U.S. PATENT DOCUMENTS

| 4,367,554 | 1/1983 | Schlossberg | 372/61 |
| 4,660,209 | 4/1987 | Osada et al. | 378/61 |
| 4,679,201 | 7/1987 | Klingel | 372/61 |
| 4,696,017 | 9/1987 | Kearsley | 378/61 |
| 4,703,489 | 10/1987 | Ross | 378/97 |
| 4,751,715 | 6/1988 | Henderson | 372/97 |
| 4,761,792 | 8/1988 | Maitland | 372/61 |

FOREIGN PATENT DOCUMENTS

| 0118381 | 9/1981 | Japan | 372/61 |
| 1098342 | 1/1968 | United Kingdom . | |
| 1271425 | 4/1972 | United Kingdom . | |
| 1573275 | 8/1980 | United Kingdom . | |

Primary Examiner—Léon Scott, Jr.
Attorney, Agent, or Firm—Spencer & Frank

[57] ABSTRACT

Laser apparatus includes an outer envelope which contains a plurality of laser discharge tubes. Each of the laser discharge tubes includes copper pieces which, when vaporised, acts as a laser amplifying medium. Each of the laser discharge tubes is of the maximum volume compatible with good efficiency which, when combined with the output power of the other tubes, enables a very high power output to be achieved compared with previously known tubes.

20 Claims, 6 Drawing Sheets

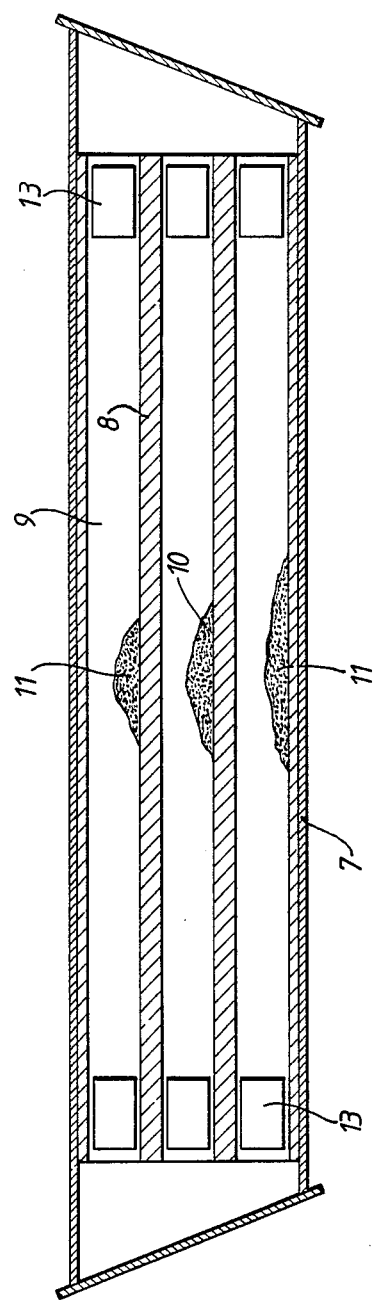

LASER APPARATUS

FIELD OF THE INVENTION

This invention relates to laser apparatus and is particularly, though not exclusively, applicable to pulsed metal-vapour lasers of the copper and gold types.

BACKGROUND OF THE INVENTION

The optimum dimensions of a laser discharge tube depend on the particular laser amplifying medium employed, but each type is limited to a maximum size beyond which efficient operation is not attainable.

The laser power obtainable from a gas discharge laser of the copper vapour type having a given length of discharge type can be increased whilst maintaining good efficiency by merely increasing the diameter of the discharge tube, because the power obtainable is proportional to the volume of the laser amplifying medium. However, at diameters greater than about 6 to 8 cm, the further power obtainable increases by only a small amount and the efficiency at which it is generated decreases as the diameter increases. In other words, for diameters greater than 6 to 8 cm or so, the laser power obtainable ceases to be proportional to the increase in volume of the laser amplifying medium. One of the principal reasons for this is that the lower laser level is metastable and is, therefore, depopulated by collisional rather than radiative processes. It is essential for efficient operation that collisional de-excitation of the atoms in the metastable state of the lower laser level is completed in the period between the pulses which excite the laser so that the maximum population inversion attainable is achieved by each pulse. Any lingering metastables (atoms in the lower laser level) will reduce the population inversion achieved and thus will reduce the laser efficiency. If the diameter of the discharge tube is too large, the volume to surface ratio becomes too great for effective de-ionisation and depletion of lower laser levels to occur by collision between excited atoms or molecules and the walls of the tube.

SUMMARY OF THE INVENTION

The present invention arose from an attempt to provide improved laser apparatus from which larger output powers are available than would be possible with a conventional laser.

According to a first aspect of the invention there is provided laser apparatus comprising an envelope within which is contained a plurality of laser discharge tubes which have a common anode and a common cathode, and means arranged to substantially confine discharges produced between the anode and cathode to the interiors of the tubes. Laser apparatus in accordance with the invention having a plurality of laser discharge tubes nested within a common envelope thus enables the diameter of the laser to be effectively increased without incurring any attendant decrease in efficiency. The laser discharge tubes may be sealed to isolate one from another but they may be open at their ends without risk of contamination between amplifying media of different tubes because of electrophoretic effects.

By confining the discharges to the interiors of the tubes, the optimum operating efficiency may be achieved. On advantageous way in which this may be done is to isolate gaps between adjacent tubes from the interiors of the tubes. In a preferred embodiment, there is included a member having apertures therein through which the tubes are located and the outer surface of which is contiguous with the interior of the envelope. Two such members may be included, one being arranged at one end of the tube and the other member at the other end, giving not only good isolation but also retaining the tubes in position. If the tubes have metal walls, the outer surface thereof may be advantageously coated with electrically insulating material, for example, such as alumina. At a high frequency, the electromagnetic field tends to force current down the outside of a conductor, this being known as the "skin effect". By including the insulating coating on the outer surfaces of the tubes, the tubes are isolated from one another thereby, it is believed, inhibiting the skin effect which might otherwise confine the discharge to the other tubes, and may even confine it to the outer regions of the outer tubes. Such an insulating coating encourages discharges to be produced in all the tubes and not in the outer tubes along, which might otherwise be the case.

In a preferred embodiment, the tubes are cylindrical and are arranged substantially parallel to one another. This is a particularly convenient configuration as the tubes may be manufactured, and the laser apparatus assembled, without difficulty. However, they could be some other shape, for example the tubes walls could be formed by a honeycomb-like structure in which a single block has passages through it which act as the discharge tubes. When the tubes are of metal, the length to diameter ratio of each tube may be of any value up to about 30.

According to a second aspect of the invention, there is provided laser apparatus comprising an envelope within which is contained a plurality of laser discharge tubes which has a common anode and a common cathode and the outer surfaces of which are coated with electrically insulating material which preferably is alumina.

The invention is particularly useful where at least one of the plurality of laser discharge tubes has a laser amplifying medium which comprises a metal vapour. Presently known metal vapour laser discharge tubes are limited to a diameter of about 6 or 8 cm because of the problems mentioned above in employing tubes of larger diameter and by employing the invention, significant improvements in the power available may be possible. Advantageously, one of the plurality includes a different amplifying medium from that of another. Thus, for example, one tube may include gold to act as a gold vapour laser and another, adjacent, tube might contain copper. This enables laser radiation to be obtained from the laser apparatus simultaneously at different wavelengths which may be maintained spatially apart or optically combined into a single beam.

Preferably at least one of the tubes has a length of about 30 times its diameter. If all of these tubes are of similar maximum dimensions, it can be seen that a very large increase in power is available with laser apparatus in accordance with the invention than has been previously possible.

BRIEF DESCRIPTION OF THE DRAWINGS

Some ways in which the invention may be performed are now described by way of example with reference to the accompanying drawings, in which:

FIGS. 3 and 4 are schematic longitudinal and transverse sections of another laser apparatus in accordance with the invention;

DESCRIPTION OF PREFERRED EMBODIMENTS

Figure 1:
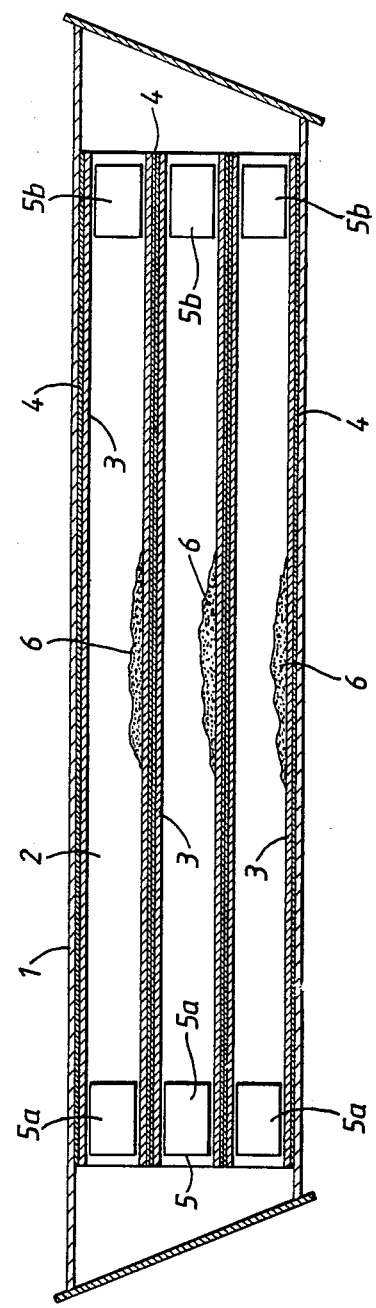
FIGS. 1 and 2 are schematic longitudinal and transverse views of laser apparatus in accordance with the invention.
Figure 2:
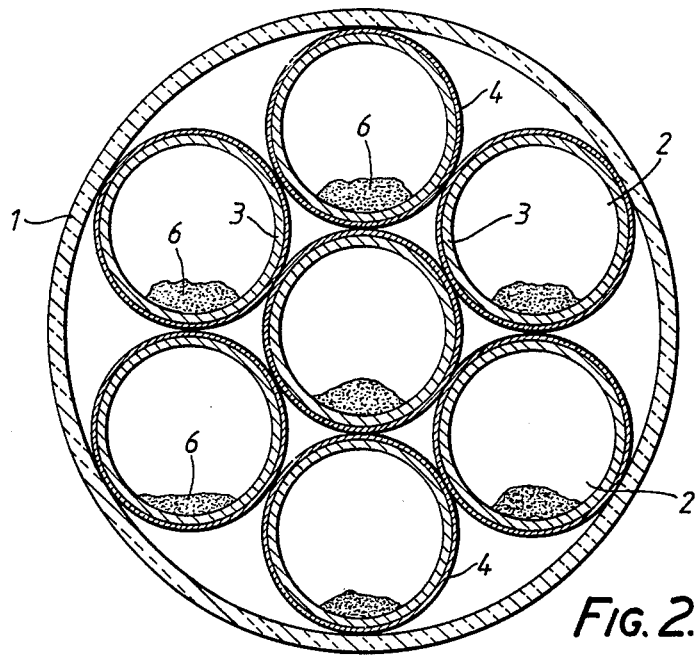

With reference to FIGS. 1 and 2, the laser apparatus includes an external envelope 1 which is cylindrical and composed of electrically insulating material. Seven cylindrical laser discharge tubes 2 are arranged within the envelope 1. The tube walls 3 are of metal, the outer surfaces of which are coated with a thin layer 4 of alumina (or zirconia) laid down by plasma (or flame) spraying techniques. The tubes 2 are positioned within the envelope 1 such that each is in contact with adjacent ones, as can be seen in FIG. 2. The laser discharge tubes 2 are open at each end and a pair of electrodes 5 is spaced apart within each tube. In this embodiment of the invention the electrodes 5a at one end of the laser apparatus are electrically connected together, as are the electrodes 5b at the other end. Each of the discharge tubes 2 includes metal pieces, which in this embodiment is copper 6. Neon buffer gas is contained within the envelope 1.

When it is wished to produce laser radiation, a discharge is produced within each of the discharge tubes 2 by applying a suitably high potential between the electrodes 5 within that tube. Successive discharges heat the tube to cause vaporisation of the copper 6 to produce a copper vapour within each of the tubes 2. The discharges produced provide pumping power for the copper vapour and laser radiation is produced.

In another embodiment (not shown) smaller discharge tubes may be located within the interstitial gaps between the seven large tubes, to make full use of the available volume. Alternatively, the interstices could be filled with electrically insulating material, for example.

Figure 4:
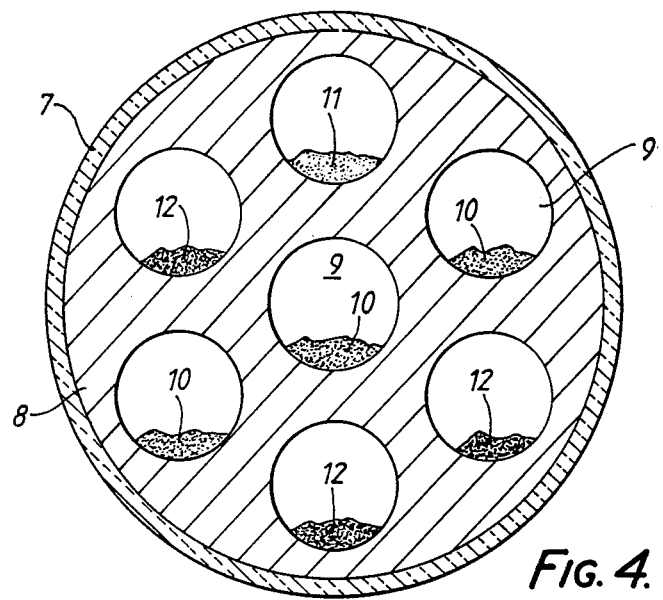

With reference to FIGS. 3 and 4, another laser apparatus in accordance with the invention comprises an outer electrically insulating envelope 7 within which is located a metal honeycomb structure 8 having a plurality of bores 9 running parallel to each other along its length. These bores 9 constitute laser discharge tubes and metal pieces are included within each of them. Some contain copper 10, others contain gold 11 and the remainder contain strontium 12. Electrodes 13 are located at each end of each tube 9.

When it is wished to produce laser radiation a large potential difference is applied between the electrode 13 to establish a discharge along substantially the whole length of each of the tubes 9. This heats the metals 10, 11 and 12 to give metal vapour and laser radiation is produced.

Figure 5:
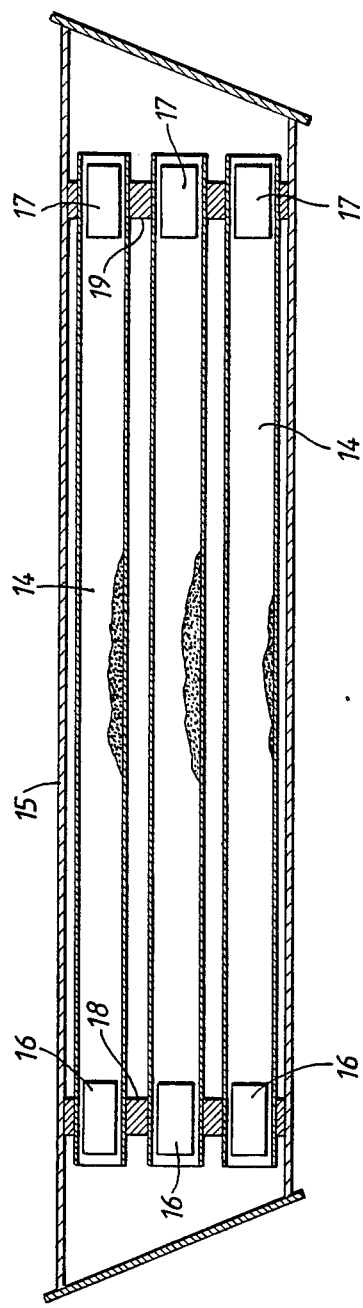
FIGS. 5 and 6 are schematic longitudinal and transverse sections of a further laser apparatus in accordance with the invention.
Figure 6:
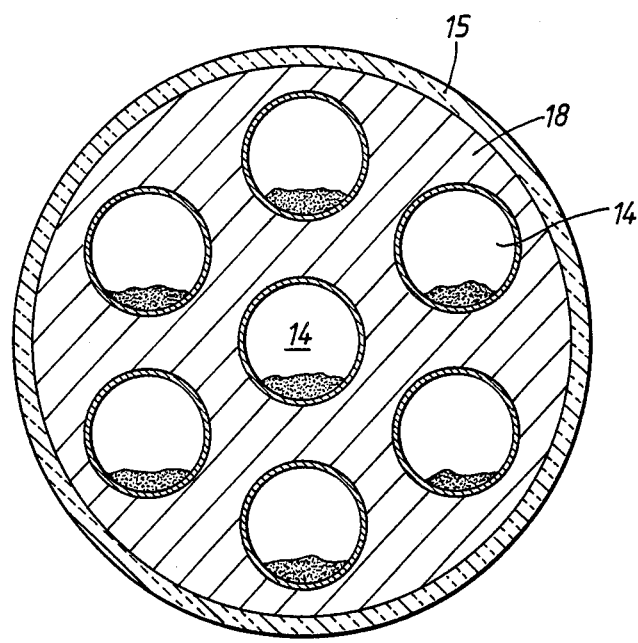

With reference to FIGS. 5 and 6, laser apparatus in accordance with the invention includes a plurality of discharge tubes 14 within an envelope 15 which have a common anode and cathode 16 and 17. The tubes 14 are arranged substantially parallel to one another and have metal walls. A respective disc shaped member 18 or 19 is located at each end of the tubes 14. The members 18 and 19 are of electrically insulating material, which in this case is alumina. They include a plurality of apertures through which the tubes 14 are located and their circumferences are contiguous with the inner surface of the envelope 15, thus effectively isolating the regions between the tubes 14 from their interiors. The members 18 and 19 alternatively could be of metal and insulating material might be laid down on the outer surfaces of the tubes 14.

Figure 7:
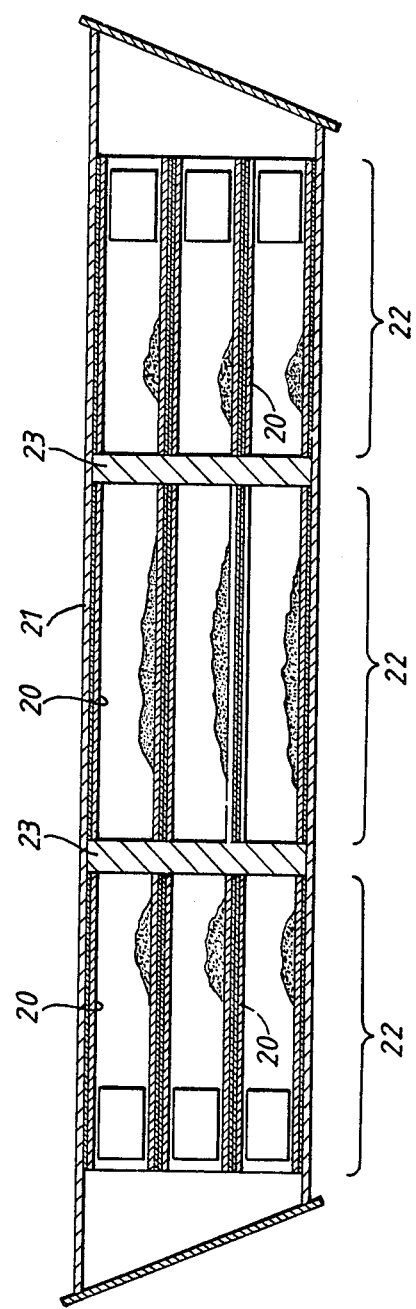
FIG. 7 is a schematic longitudinal section of another laser apparatus in accordance with the invention.

With reference to FIG. 7, in another laser apparatus in accordance with the invention, a plurality of segmented discharge tubes 20 are included within an envelope 21. Each segment 22 comprises a bundle of tubes which is separated from adjacent segments by a ceramic spacer 23.

We claim:

1. In a gas discharge laser apparatus comprising an envelope and a plurality of laser discharge tubes contained within said envelope, the improvement comprising means, including a common anode for said plurality of tubes disposed at one end of said tubes and a common cathode for said plurality of tubes disposed at the opposite end of said tubes, for producing a gas discharge; and wherein each of said plurality of discharge tubes is formed of metal; and an electrically insulating material coats the outer surfaces of said plurality of tubes. such that output power of each tube when combined with output power of other tubes produces a high output power 2. Laser apparatus as claimed in claim 1 wherein said insulating material is alumina.

3. Laser apparatus as claimed in claim 1 wherein said tubes are cylindrical and are arranged substantially parallel to one another with each said tube being adjacent and in contact with at least two other of said tubes.

4. Apparatus as claimed in claim 1 wherein said tubes are metal cylinders and electrically insulating material is included in the interstices between them.

5. Apparatus as claimed in claim 4 wherein said electrically insulating material is alumina.

6. Apparatus as claimed in claim 1 and including means arranged to isolate gaps between adjacent ones of said tubes from the interiors of said tubes.

7. Apparatus as claimed in claim 6 wherein said means arranged to isolate gaps comprises at least one member having apertures therein through which said tubes are located, with the outer surface of said member being contiguous with the interior surface of said envelope.

8. Apparatus as claimed in claim 7 and including two of said members, with one of said members being arranged near one end of said tubes and the other of said members being at the other end of said tubes.

9. Laser apparatus as defined in claim 8 wherein said members are made of metal.

10. Laser apparatus as claimed in claim 1 wherein said tubes are formed of segments which are spaced apart by electrically insulating spacers.

11. Laser apparatus as claimed in claim 1 wherein at least one of said plurality of tubes contains a laser amplifying medium which forms a metal vapour.

12. Laser apparatus as claimed in claim 1 wherein at least two of said plurality of tubes contain respectively different laser amplifying mediums which form metal vapors.

13. Laser apparatus as claimed in claim 1 wherein the wavelength distribution of laser radiation obtained from one said tube is different to that obtained from another said tube.

14. Laser apparatus as claimed in claim 1 wherein at least one of said tubes has a length of about 30 times its diameter.

15. In a gas discharge laser apparatus including an envelope, and a plurality of laser discharge tubes contained within said envelope the improvement comprising means, including a common anode for said plurality of tubes disposed at one end of said plurality of tubes and a common cathode for said plurality of discharge tubes disposed at the opposite end of said tubes, for generating a gas discharge; and wherein each of said plurality of discharge tubes are defined by a plurality of bores in a piece of solid metal disposed in said envelope such that output power of each tube when combined with output power of other tubes produces a high output power.

16. Laser apparatus as defined in claim 15 wherein said bores are cylindrical and are arranged substantially parallel to one another.

17. Laser apparatus as defined in claim 15 wherein at least one of said plurality of tubes contains a laser amplifying medium which forms a metal vapour.

18. Laser apparatus as defined in claim 15 wherein at least two of said plurality of tubes contain respectively different laser amplifying mediums which form metal vapors.

19. Laser apparatus as defined in claim 15 wherein the wavelength distribution of laser radiation obtained from one said tube is different to that obtained from another said tube.

20. Laser apparatus as defined in claim 15 wherein at least one of said tubes has a length of about 30 times its diameter.

* * * * *